US012275124B2

(12) United States Patent
Meredith

(10) Patent No.: US 12,275,124 B2
(45) Date of Patent: Apr. 15, 2025

(54) FASTENER DRIVING TOOL TRIGGER ASSEMBLY

(71) Applicant: Black & Decker, Inc., New Britain, CT (US)

(72) Inventor: Daryl S. Meredith, York, PA (US)

(73) Assignee: Black & Decker, Inc., New Britain, CT (US)

( * ) Notice: Subject to any disclaimer, the term of this patent is extended or adjusted under 35 U.S.C. 154(b) by 0 days.

(21) Appl. No.: 18/127,269

(22) Filed: Mar. 28, 2023

(65) Prior Publication Data

US 2023/0234199 A1 Jul. 27, 2023

Related U.S. Application Data

(63) Continuation of application No. PCT/US2021/052420, filed on Sep. 28, 2021.

(60) Provisional application No. 63/084,383, filed on Sep. 28, 2020.

(51) Int. Cl.
*B25C 1/00* (2006.01)
*B25C 1/04* (2006.01)

(52) U.S. Cl.
CPC .............. *B25C 1/008* (2013.01); *B25C 1/047* (2013.01)

(58) Field of Classification Search
CPC ......... B25C 1/008; B25C 1/047; B25C 1/043; B25D 16/006; B25D 2250/261
See application file for complete search history.

(56) References Cited

U.S. PATENT DOCUMENTS

| | | | |
|---|---|---|---|
| 4,378,084 | A | 3/1983 | Scala |
| 4,679,719 | A | 7/1987 | Kramer |
| 5,732,870 | A | 3/1998 | Moorman et al. |
| 5,772,096 | A | 6/1998 | Osuka et al. |
| 5,918,788 | A | 7/1999 | Moorman et al. |
| 6,523,621 | B1 | 2/2003 | Gosis et al. |
| 6,604,664 | B2 | 8/2003 | Robinson |
| 7,143,918 | B2 | 12/2006 | Aguirre et al. |
| 7,163,134 | B2 | 1/2007 | Moeller et al. |

(Continued)

FOREIGN PATENT DOCUMENTS

EP 1223009 A2 7/2002

OTHER PUBLICATIONS

Extended European Search, dated Aug. 27, 2024, in corresponding EP application No. 21873642.9-1017/4217149 PCT/2021052420.

*Primary Examiner* — Andrew M Tecco
*Assistant Examiner* — Nicholas E Igbokwe
(74) *Attorney, Agent, or Firm* — Rhonda Barton

(57) ABSTRACT

A mechanical timer mechanism can include a driven gear mounted to a rotary damper and a drive gear operably coupled to the driven gear. In bump mode, movement of an auxiliary trigger to its actuating position can initially move the drive gear from a home position into its wind-up position. Thereafter, a contact trip can continue to move the drive gear to its wind-up position and an actuator of a principal trigger to its actuating position each time the contact trip is actuated, unless the timing mechanism has timed-out between actuations. In sequential mode, the drive gear can be moved into a timer lock-out position which holds the contact trip in a bypass position in which the contact trip will not engage the actuator of the auxiliary trigger unless the auxiliary trigger is moved to its actuating position before actuation of the contact trip.

7 Claims, 9 Drawing Sheets

(56) References Cited

U.S. PATENT DOCUMENTS

| | | | | |
|---|---|---|---|---|
| 7,510,105 | B2 | 3/2009 | Moeller et al. | |
| 9,381,633 | B2 | 7/2016 | Moore et al. | |
| 9,486,907 | B2 | 11/2016 | Birk | |
| 9,550,288 | B2 | 1/2017 | Moore et al. | |
| 9,662,776 | B2 * | 5/2017 | Puppala | B25C 1/008 |
| 9,782,880 | B2 | 10/2017 | Moore et al. | |
| 2008/0296337 | A1 * | 12/2008 | Yang | B25C 1/008 227/8 |
| 2014/0110450 | A1 * | 4/2014 | Moore | B25C 1/008 227/8 |
| 2014/0110452 | A1 * | 4/2014 | Moore | B25C 1/008 227/8 |
| 2016/0114470 | A1 | 4/2016 | Weigmann et al. | |
| 2016/0136797 | A1 | 5/2016 | Weigmann et al. | |
| 2017/0129084 | A1 | 5/2017 | Moore et al. | |
| 2017/0232599 | A1 | 8/2017 | Puppala et al. | |
| 2017/0274511 | A1 * | 9/2017 | Huang | B25C 1/008 |
| 2019/0389045 | A1 * | 12/2019 | Ishikawa | B25C 1/047 |
| 2020/0171638 | A1 * | 6/2020 | Meredith | B25C 1/008 |

* cited by examiner

FASTENER DRIVING TOOL TRIGGER ASSEMBLY

CROSS-REFERENCE TO RELATED APPLICATIONS

The present application is a continuation of international application PCT/US2021/052420 filed on Sep. 28, 2021, which claims priority under 35 U.S.C. § 119 to U.S. Provisional Patent Application Ser. No. 63/084,383 entitled "Fastener Driving Tool Trigger Assembly", filed Sep. 28, 2020. The entirety of the above application is incorporated herein by reference.

BACKGROUND OF THE INVENTION

Field of the Invention

The present disclosure relates to a fastener driving tool that has different modes of operation, such as for example, a sequential mode and a bump mode, in which the bump mode times out or reverts out of bump mode after a predetermined amount of time.

Description of the Related Art

This section provides background information related to the present disclosure which is not necessarily prior art.

A fastener driving tool is a tool with a reciprocating driver that is selectively driven along a driver axis to drive a fastener, such as a nail, staple, brad, etc. into a workpiece. Fasteners are driven into the workpiece by the driver blade portion of the driver through a process known as a "drive" or "driving cycle". Generally, a driving cycle involves the driver striking a fastener head during a drive stroke to an extended position and returning to a home or returned position during a return stroke.

It can be desirable for such a fastener driving tool to have multiple modes of operation. For example, the tool can have a sequential mode of operation in which the tool will fire or actuate and drive a single fastener into a workpiece upon sequential engagement of a contact trip against the workpiece, followed by actuation of a trigger into its firing or actuating position. The tool can also have a bump mode of operation in which the tool will drive a fastener into a workpiece each time the contact trip engages or is bumped against a workpiece as long as the trigger has previously been moved into, and remains in, its firing or actuating position.

In bump mode, the tool can continue to drive a fastener each time the contact trip is bumped against the workpiece until the trigger is released, allowing the contact trip to return to its home position. It can be desirable to have the bump mode time out or revert out of bump mode, so that the user is required to release and reengage the trigger before continued bump mode operation. Although providing an electronic timer mechanism is one possibility, for non-electrically driven, for example, pneumatic fastener driving tools, adding and powering such electrical components can be problematic and costly for a wide range of reasons.

SUMMARY OF THE INVENTION

A fastener driving tool trigger assembly includes a rotary damper coupled to a tool housing, the rotary damper having a damper shaft. A driven gear is coupled to the damper shaft to transfer rotation of the driven gear to the damper shaft in a first direction. A drive gear coupled to the tool housing and being movable between a timed-out position and a wind-up position and biased toward the timed-out position. The drive gear is operably coupled to the driven gear to rotate the driven gear in the first direction as the drive gear moves away from the wind-up position toward the timed-out position and to rotate the driven gear in a second direction opposite the first direction as the drive gear moves away from the timed-out position toward the wind-up position. A principal trigger is pivotably coupled to the tool housing and movable between a principal trigger home position and a principal trigger actuating position. An auxiliary trigger is pivotably coupled to the tool housing and movable between an auxiliary trigger home position and an auxiliary trigger actuating position. An actuator is pivotably coupled to the principal trigger and movable between an actuator home position and an actuator actuating position. A drive gear pushing member is coupled to the auxiliary trigger and engageable with the drive gear to move the drive gear from the timed-out position to the wind-up position in response to the auxiliary trigger moving from the auxiliary trigger home position to the auxiliary trigger actuating position. A contact trip is coupled to the housing and movable between a contact trip home position and a contact trip actuating position. With the drive gear positioned between the timed-out and wind-up positions, the contact trip is engageable with the drive gear to move the drive gear into the wind-up position as the contact trip moves from the contact trip home position to the contact trip actuating position. With the principal trigger positioned in the principal trigger actuating position, the contact trip is engageable with the actuator to move the actuator into the actuator actuating position as the contact trip moves from the contact trip home position to the contact trip actuating position. With the drive gear positioned in the timed-out position, the contact trip is engageable with the drive gear, with the driving gear in an orientation which prevents the contact trip from rotating the drive gear into the wind-up position and prevents the contact trip from moving into the contact trip actuating position.

A one-way clutch is coupled to the damper shaft between the damper shaft and the driven gear to transfer rotation of the driven gear to the damper shaft in the first direction, but not in the second direction.

The driven gear is mounted on the damper shaft with the one-way clutch mounted on the damper shaft between the driven gear and the damper shaft.

The contact trip has a front arm and a rear arm moveably coupled together at a coupling including a biasing member. The front arm of the contact trip is selectively engageable with a workpiece, and the rear arm of the contact trip is selectively engageable with the drive gear. The biasing member allows the front arm to continue moving away from the principal trigger home position while movement of the rear arm away from the principal trigger home position is arrested by engagement of the drive gear with the drive gear positioned in the timed-out position in an orientation which prevents the rear arm from rotating the drive gear into the wind-up position and prevents the rear arm from moving into the contact trip actuating position.

The drive gear pushing member includes a recess that engages a wind-up protrusion of the drive gear to move the drive gear from the timed-out position to the wind-up position in response to the auxiliary trigger moving from the auxiliary trigger home position to the trigger actuating position.

The drive gear is positioned in the timed-out position, and cooperating engagement surfaces of the drive gear and the contact trip are positioned normal to a direction of movement of the contact trip between the contact trip home position and the contact trip actuating position.

Cooperating engagement surfaces of the drive gear and contact trip include a protrusion and a recess, respectively. With the drive gear positioned in the timed-out position and the contact trip engaged against cooperating engagement surfaces of the drive gear, the protrusion is received in the recess to limit movement of the principal trigger from the principal trigger home position to the principal trigger actuating position.

BRIEF DESCRIPTION OF THE DRAWINGS

The accompanying drawings illustrate preferred embodiments of the invention according to the practical application of the principles thereof, and in which.

Corresponding reference numerals indicate corresponding parts throughout the several views of the drawings.

DETAILED DESCRIPTION OF THE INVENTION

Figure 1:
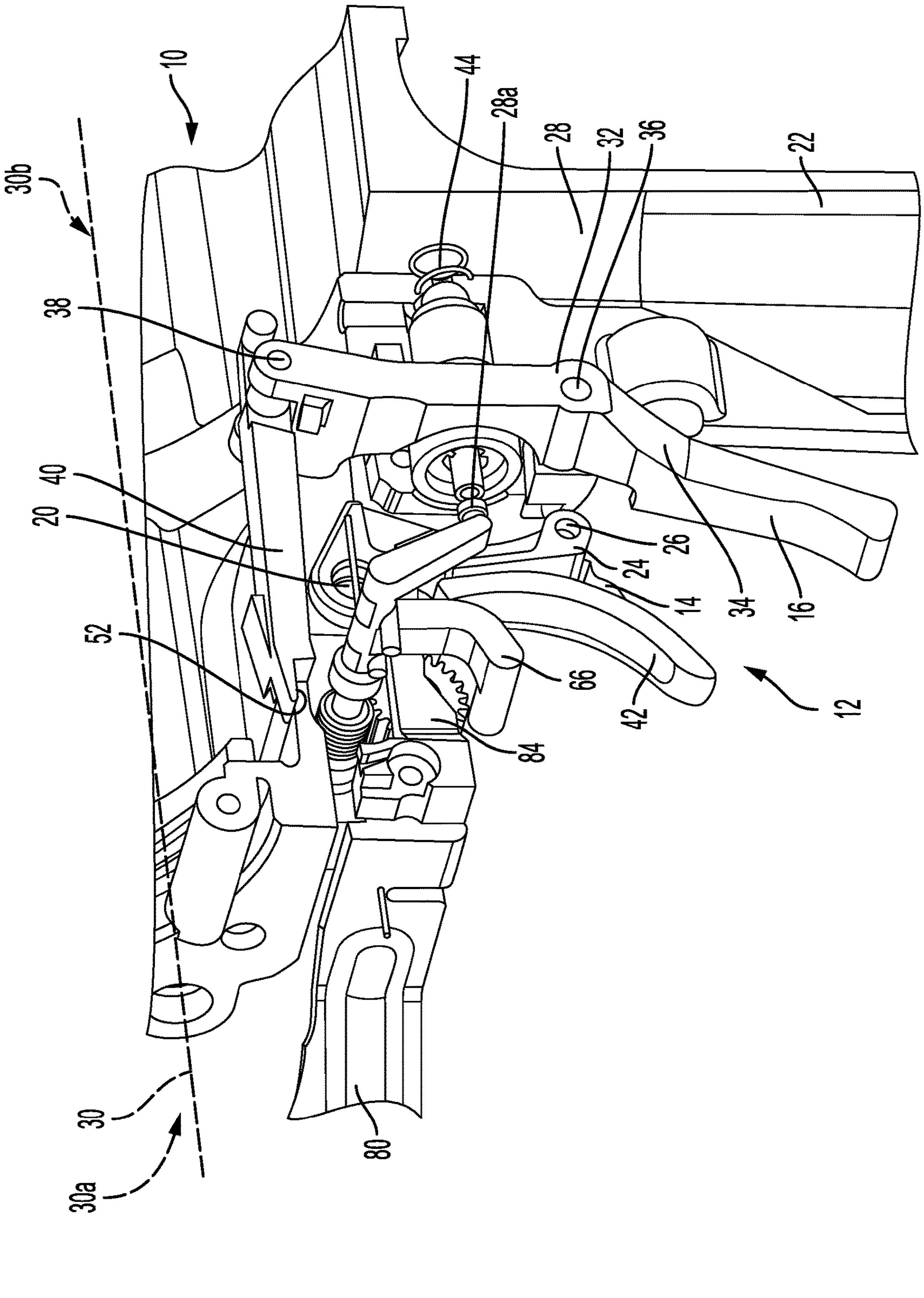
FIG. 1 is a view of one example of a fastener driving tool trigger assembly in accordance with the present disclosure for a pneumatic fastener driving tool.

FIG. 1 illustrates a section of a fastening tool 10 according to an embodiment of the invention.

According to several aspects, the fastening tool 10 can be any type of portable tool including a pneumatic nailer. The fastening tool 10 includes a housing 18 that, with a nosepiece assembly (not shown) at a nose end 30*a* of the tool, defines a fastener drive track through which fasteners, such as nails, are driven. The fastening tool 10 is designed to drive a fastener into a workpiece.

Example embodiments will now be described more fully with reference to the accompanying drawings.

As shown in FIG. 1, the fastener driving tool 10 includes one example of a fastener driving tool automatic reversion trigger assembly 12. In accordance with the present disclosure, the trigger assembly 12 is provided for actuating the fastener driving cycle of the tool 10. The trigger assembly 12 can include a principal trigger 14 pivotably coupled to the tool housing 18 about a trigger pivot pin 20 at a first position, and an auxiliary trigger 16 pivotably coupled to the tool housing 18 at a second position different from the first position. In an embodiment, the auxiliary trigger 16 can be coupled to the tool handle 22. An actuator 24 can be pivotably coupled to and carried by the principal trigger 14 about an actuator pivot pin 26. As detailed further herein, the trigger assembly 12 can be constructed and arranged to actuate a trigger valve 28, and hence, initiate the driving cycle. For example, such actuation of the trigger valve 28 can, directly or indirectly, allow pressurized gas to move a fastener driver (not shown) along a driver axis 30 through the fastener driving cycle. The trigger valve 28 may be moved to the actuated position by pressing a valve stem 28*a* against the force applied on the valve stem 28*a* by the pressurized gas, and the bias of a valve spring 44 that is operatively engaged, such as by being disposed within, the trigger valve 28. A center portion of the actuator 24 that is in between the proximal end and the distal end thereof is configured to press against the valve stem 28*a* of the trigger valve 28. The trigger assembly 12 can include a contact trip 80 movably coupled to the tool housing to move in a direction parallel to the driver axis 30. The contact trip 80 can engage a mechanical timer mechanism 46 that controls the rate of return of the trigger from an actuated position to the home position and, in the home position, locks the contact trip 80.

In an embodiment, the principal trigger 14 can include an arm portion 42 extending downwardly from the trigger pivot pin 20 and from the housing 18. The arm portion 42 has an upper or proximal end that engages the trigger pivot pin 20 and a lower or distal end that is a free end. The principal trigger 14 can be pivotably coupled to the housing 18 to pivot relative to the housing adjacent the upper or proximal end of the arm 42. The free end of the arm portion 42 allows the arm portion to be manually engaged by a user.

In an embodiment, the auxiliary trigger 16 can have an elongated body including a first arm 32 and a longitudinally opposite second arm 34. The auxiliary trigger 16 can be connected to the housing 18 by a hinge or anchor member 36 located between the first arm 32 and the second arm 34. In an embodiment, the anchor member 36 is centered between the first arm 32 and the second arm 34. The first arm 32 can extend outwardly from the anchor member 36 toward the driver axis 30. The first arm 32 can be attached to a drive gear pushing member 40 of the trigger assembly 12 by a pushing member pivot pin such as rotary pin 38. The second arm 34 can extend outwardly from the anchor member 36 in the opposite direction of the first arm. The second arm 34 defines a free end of the auxiliary trigger 16 and can be manually engaged by the user. The second arm 34 is biased away from the handle 22, and when pulled, contact the handle.

The actuator 24 can be pivotably coupled to the principal trigger 14 adjacent the lower or proximal end (with respect to the pivot pin 20) of the actuator 24. The actuator 24 can be pivotably coupled to and carried by the principal trigger 14 to pivot relative to the principal trigger 14 adjacent a lower or distal end of the arm 42 of the principal trigger 14. When the principal trigger 14 is pulled, the actuator 24 can be carried by the principal trigger 14 as the principal trigger moves. As shown in FIG. 1, the actuator 24 can be biased relative to the principal trigger 14 in a counterclockwise direction away from the trigger valve 28 toward an actuator home position by a biasing member coupled to the housing 18. The biasing member can be a trigger spring (not shown) positioned between the portion of the housing 18 that supports the trigger valve 28 and the actuator 24, and is configured to bias the actuator 24 and the principal trigger 14 away from the trigger valve 28. In an embodiment, the biasing member can be, for example, a compression spring 44 positioned between the trigger valve 28 and the actuator 24. The same spring 44 can also operate to bias the principal trigger 14 relative to the housing 18 away from the trigger valve 28 toward the trigger home position.

The drive gear pushing member 40 engages and rotates a drive gear 50 in the mechanical timer lock 46. The drive gear pushing member 40 can have an elongated body, defined by a forward end 48 and a rear end 49, and be arranged substantially parallel to the driver axis 30, when at rest. At its rear end 49, the drive gear pushing member 40 can be pivotably coupled to and carried by the first arm 32 of the auxiliary trigger 16 about the pushing member pivot pin 38. The drive gear pushing member 40 can be carried by the auxiliary trigger 16 adjacent a proximal (relative to the pivot pin 20) end of the principal trigger 14. When the auxiliary trigger 16 is pulled, the drive gear pushing member 40 can be carried by the auxiliary trigger 16 as the auxiliary trigger 16 moves. When the auxiliary trigger 16 moves from the at-rest or home position to the actuated position, the drive gear pushing member 40 also moves from an at-rest position in a direction toward a nose end 30*a* of the fastener driving tool 10. The forward end 48 of the drive gear pushing member 40 is designed to engage the drive gear 50. The forward end 48 of the drive gear pushing member 40 can include a cutout portion or recess 52 that engages and rotates the drive gear 50 using a pushing action as detailed herein.

Figure 4:
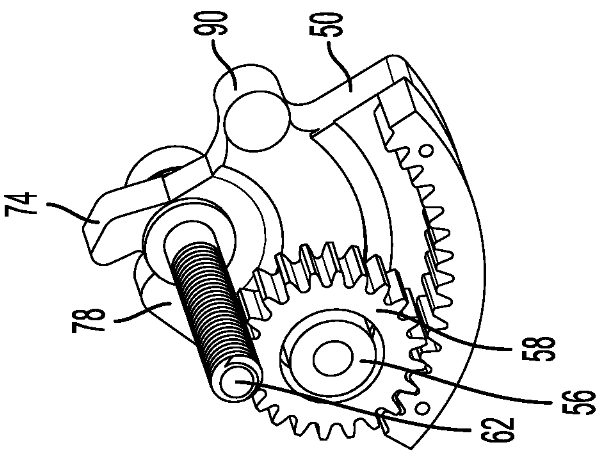
FIG. 4 is a rear perspective view of the mechanical timer mechanism of the fastener driving tool trigger assembly of FIG. 1 showing engagement of the drive gear with the driven gear.
Figure 3:
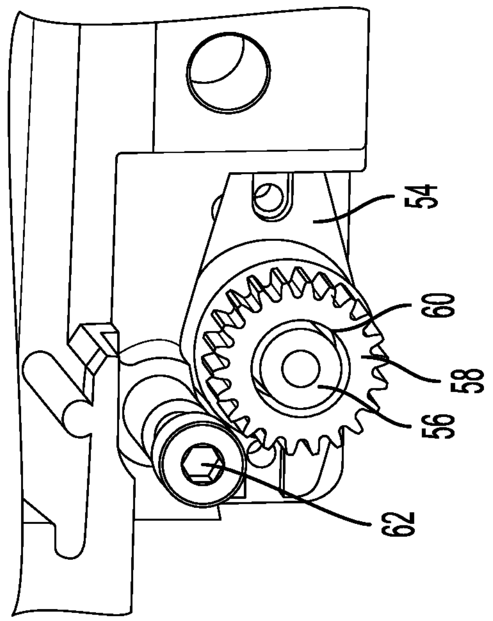
FIG. 3 is another perspective view of the mechanical timer mechanism of the fastener driving tool trigger assembly of FIG. 1 showing an unobstructed view of the rotary damper and driven gear.
Figure 2:
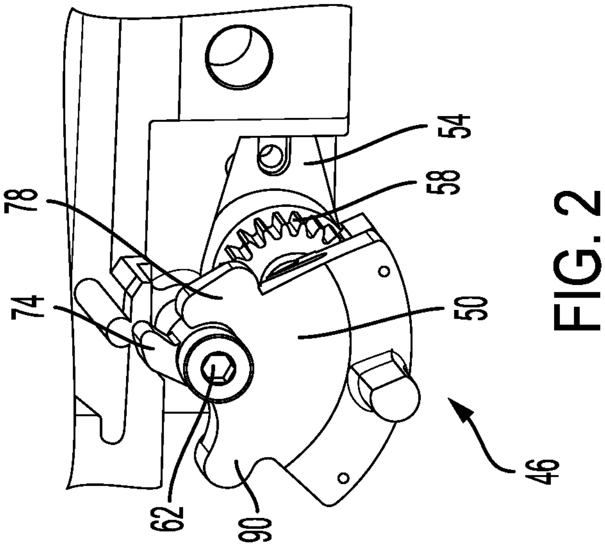
FIG. 2 is a perspective view of a mechanical timer mechanism of the fastener driving tool trigger assembly of FIG. 1.

FIGS. 2, 3 and 4 illustrate an embodiment of the mechanical timer mechanism 46. The mechanical timer mechanism includes a rotary damper 54, a damper shaft 56 and a driven gear 58. The rotary damper 54 can provide a consistent resistance to rotation of a damper shaft 56. For example, a viscous fluid, such as silicone, can fill a small gap between the rotary damper housing and the damper shaft 56 to provide a consistent frictional resistance to rotation of the damper shaft. As shown in FIG. 3, a one way or "sprag clutch" 60 can be mounted on the damper shaft 56 of the rotary damper 54. For example, the inner diameter of the one-way clutch 60 can be press-fit onto the shaft 56 of the damper 54. A driven gear 58 can be mounted on the shaft 56 with the one-way clutch 60 disposed between the driven gear 58 and the shaft 56. For example, the driven gear 58 can be press-fit onto the outer diameter of the one-way clutch 60. The driven gear 58 has a plurality of teeth on the outer perimeter thereof.

As a result of the driven gear 58 being mounted to the damper shaft 56 via the one-way clutch 60, when the driven gear 58 is rotated in a first direction, for example in the clockwise direction, (as viewed in FIGS. 2 and 3), the sprag clutch 60 transfers the clockwise movement of the driven gear 58 to the damper shaft 56 so that there is a corresponding clockwise rotation of the damper shaft 56. Conversely, when the driven gear 58 is rotated in a second, opposite direction, for example in a counterclockwise direction (as viewed in FIGS. 2 and 3), the sprag clutch 60 slips or disengages the counterclockwise movement of the driven gear 58 from the damper shaft 56 so that there is no corresponding counterclockwise rotation of the damper shaft 56. Thus, in the clockwise or first direction, the rotary damper 54 provides consistent dampening or resistance to rotation of the driven gear 58, but not in the second direction.

Figure 6:
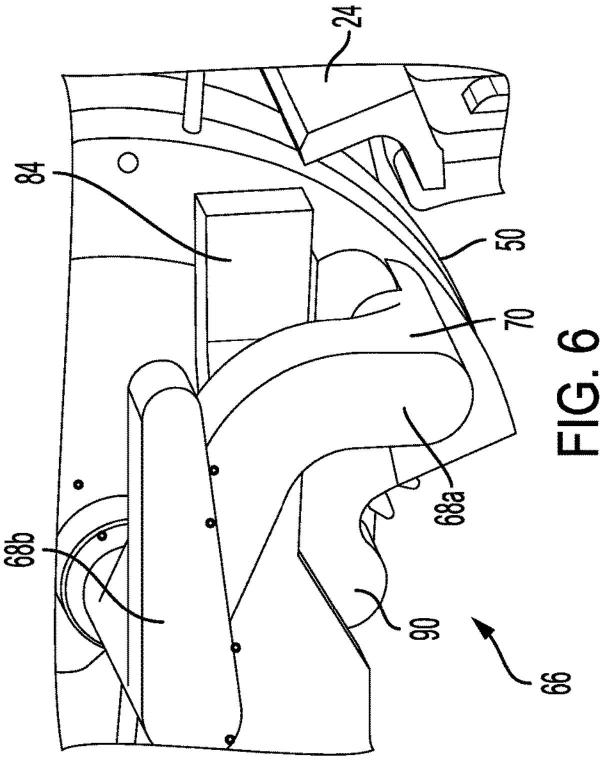
FIG. 6 illustrates the mode selector in engagement with the mode selector engagement member on the drive gear.
Figure 8:
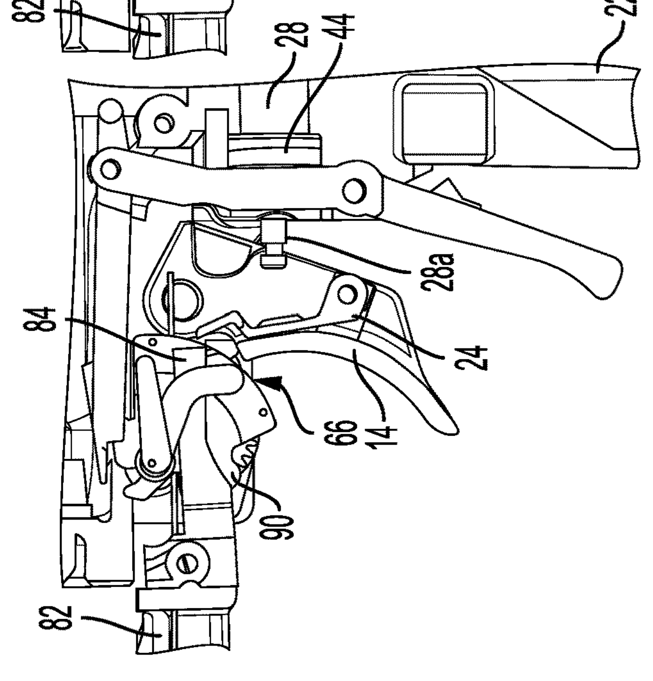
FIG. 8 is a side elevation view of various components of the fastener driving tool trigger assembly of FIG. 1 in their corresponding home positions, in sequential mode.
Figure 11:
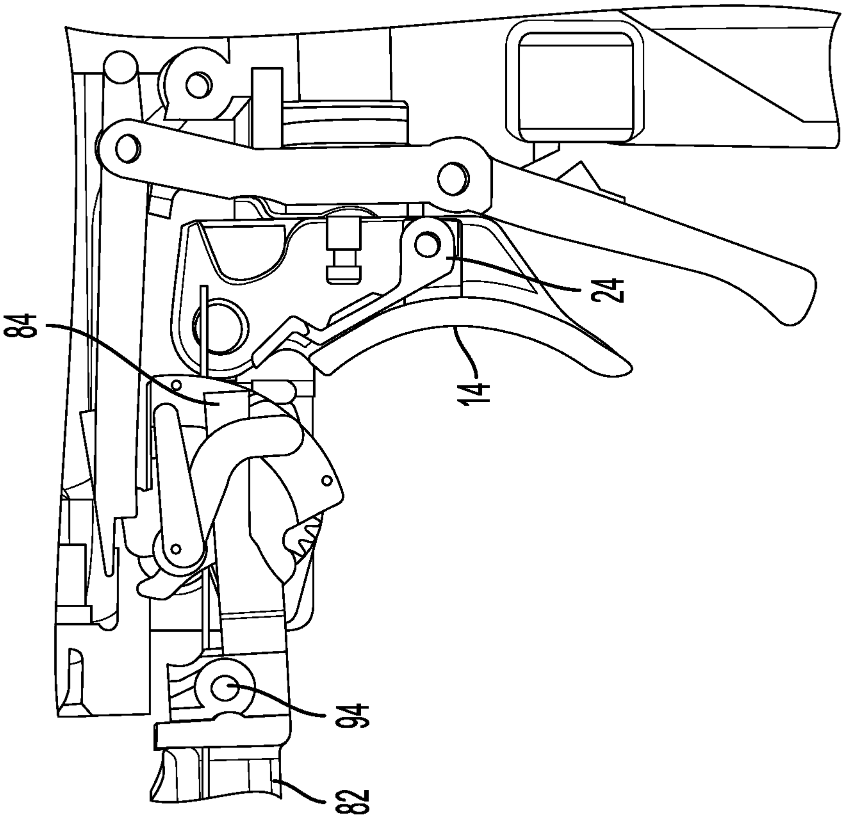
FIG. 11 is a side elevation view of various components of the fastener driving tool trigger assembly of FIG. 1, in sequential mode showing the path of the contact trip in its bypass position with the trigger in its actuating position.

As shown in FIGS. 2 and 4, the drive gear 50 can have a plate body and an arcuate ledge 51 projecting from a side surface of the plate body. The arcuate ledge 51 has a plurality of teeth that engage a plurality of teeth on the driven gear 58 in a meshed arrangement. The drive gear 50 can also be biased to rotate in a first direction, for example, in a clockwise direction (as viewed in FIGS. 14A, 15 and 17) about the drive gear pivot pin 62 by a timer spring 64, causing the driven gear 58 to also rotate in the same first or clockwise, direction. Alternatively, the drive gear 50 can be coupled to the driven gear 58 in a way that they rotate or move in opposite directions. The drive gear 50 can be mounted to the housing 18 on an axle or pivot pin 62. The drive gear can be rotated or wound to a wind-up position in a second direction, such as for example, a counterclockwise direction, as shown in FIGS. 6, 8 and 11, about the drive gear pivot pin 62. The spring force of the timer spring 64 can work against the consistent dampening or resistance to rotation of the driven gear 58 of the rotary damper 54 to deliver a predetermined rate at which the drive gear 50 rotates the driven gear 58, to thereby operate as a mechanical timer as detailed herein. The drive gear 50 has a plurality of projections about the perimeter thereof. As shown in FIG. 2, the projections include a locking nose portion 90, a spur portion 74, and an oblong lobe portion 78 adjacent to the spur. The projections engage other components of the trigger assembly 12 in order to execute the timer function.

Figure 5:
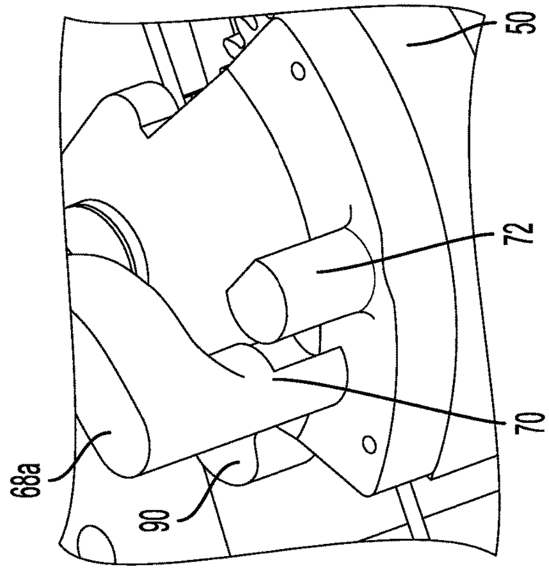
FIG. 5 illustrates a view of the mode selector and corresponding mode selector engagement member on the drive gear.

The fastener driving tool 10 can be operated in either a bump mode, or a sequential mode. A user can manually select the mode of operation by positioning a mode selector 66 in either a sequential mode position as shown in FIGS. 6-11 or in a bump mode position as shown in FIGS. 13-17. The mode selector 66 is mounted outside the housing 18 so that it can be accessible to the user. The mode selector 66 can include a pair of legs that rotate about the pivot pin 62. The pair of legs can include a first leg 68*a* and a second leg 68*b* for example. The legs 68*a*, 68*b* have a pivot connection end that connects to the pivot pin 62 and a free end. The free end of the second leg 68*a* can include a pin or protrusion 70 as shown in FIG. 5, that engages a mode selector engagement member on the drive gear. The mode selector engagement member includes detents, recesses, or apertures, such as wind-up protrusion or post 72, on the drive gear 50. As a result of the engagement between the protrusion 70 and the post 72, the mode selector 66 can be selectively retained in the bump and sequential mode positions. In an embodiment, the protrusion 72 can be a pin.

The contact trip 80 has a first configuration in sequential mode and a second configuration, different from the first configuration in bump mode. The contact trip 80 includes a front arm 82 that contacts the workpiece and is coupled to a rear arm 84 that contacts the actuator 24.

Figure 13:
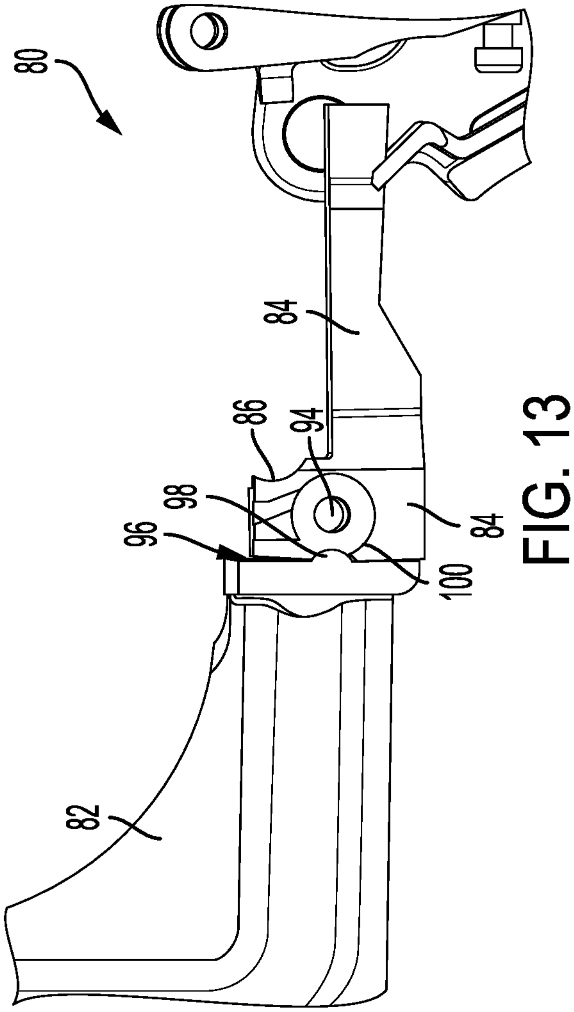
FIG. 13 is a side elevation view of the contact trip assembly of the fastener driving tool trigger assembly of FIG. 1 in bump mode.

FIG. 6 illustrates the contact trip 80 in sequential mode. In sequential mode, the rear arm 84 of the contact trip 80 is out of alignment with the front arm 82, for example non-parallel to the driver axis 30, as shown in FIG. 13. Actuation of the trigger valve occurs when the contact trip is pressed against the workpiece before the trigger is pulled.

Operation of the fastener driving tool 10 in sequential mode is described with particular reference to FIGS. 6-12. FIG. 6 illustrates that to operate the tool in sequential mode, the mode selector 66 is placed into its corresponding sequential mode position. As shown in FIG. 6, the protrusion 70 of the mode selector 66 engages the cooperating wind-up or post protrusion 72 of the drive gear 50 to rotate and retain the drive gear 50 into a timer lock-out position. In the timer lock-out position, the drive gear 50 is rotated to a fixed position and the projection 72 maintains the rear arm 84 of the contact trip in a predetermined position. The drive gear 50 remains in the timer lock-out position as long as the mode selector 66 is in the sequential mode position. Thus, the mechanical timer mechanism 46 of the trigger assembly 12 is locked-out or inoperative while the tool 10 is in a sequential mode of operation. The timer lock-out position of the drive gear 50 can be a rotary position, for example counterclockwise, past or beyond its wind-up position from its home position, as shown in FIGS. 6, 8 and 11. In other words, the drive gear 50 can rotate from its home or timed-out position, past its wind-up position, before reaching or moving into its lock-out position. As an example, shown in FIG. 6, in the past wind-up position, the locking nose portion 90 of the drive gear 50 projects below the contact trip 80.

Figure 7:
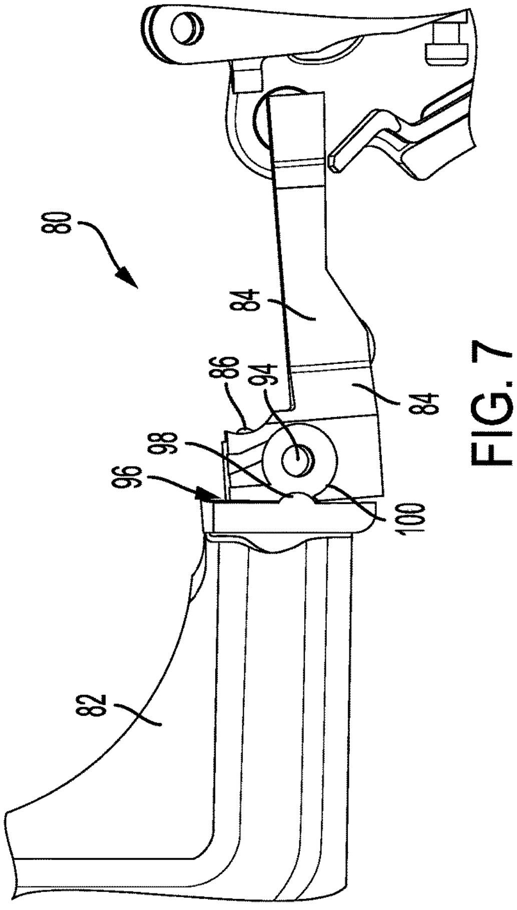
FIG. 7 is a side elevation view of the contact trip assembly of the fastener driving tool trigger assembly of FIG. 1 in sequential mode.
Figure 10:
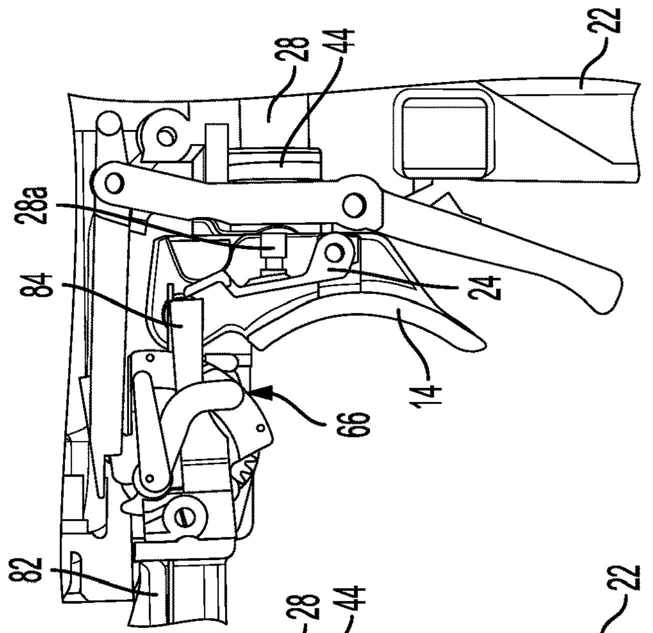
FIG. 10 is a side elevation view of various components of the fastener driving tool trigger assembly of FIG. 1 in their corresponding actuating and wind-up positions in sequential mode.
Figure 9:
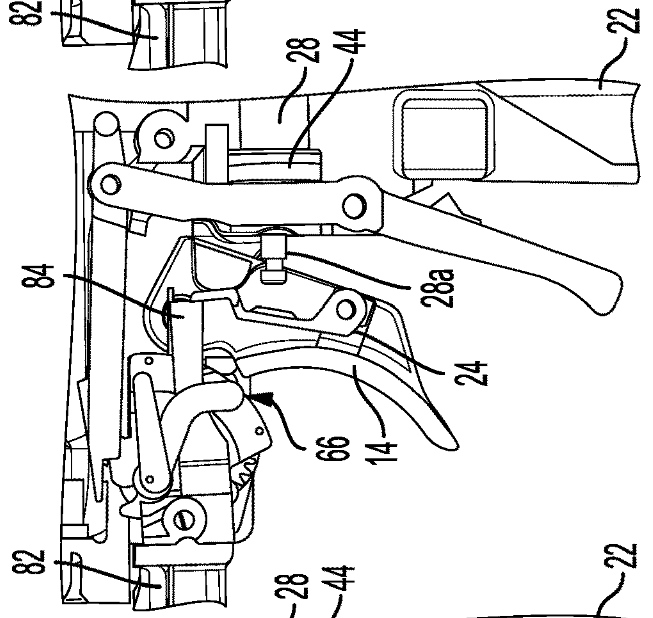
FIG. 9 is a side elevation view of various components of the fastener driving tool trigger assembly of FIG. 1 when the contact trip is depressed in sequential mode.

FIGS. 6 and 7 illustrate that, in addition to being held by the mode selector protrusion 70, the drive gear post or wind-up protrusion 72 also lifts the rear arm 84 of the contact trip 80, causing the rear arm to rotate about the contact trip pivot pin 94 into a contact trip bypass position. In an embodiment, the rear arm 84 is rotatable about 4-5 degrees with respect to the driver axis 30. In contrast, the front arm 82 of the contact trip 80 cannot rotate and remains properly aligned with the driver axis 30.

Figure 12:
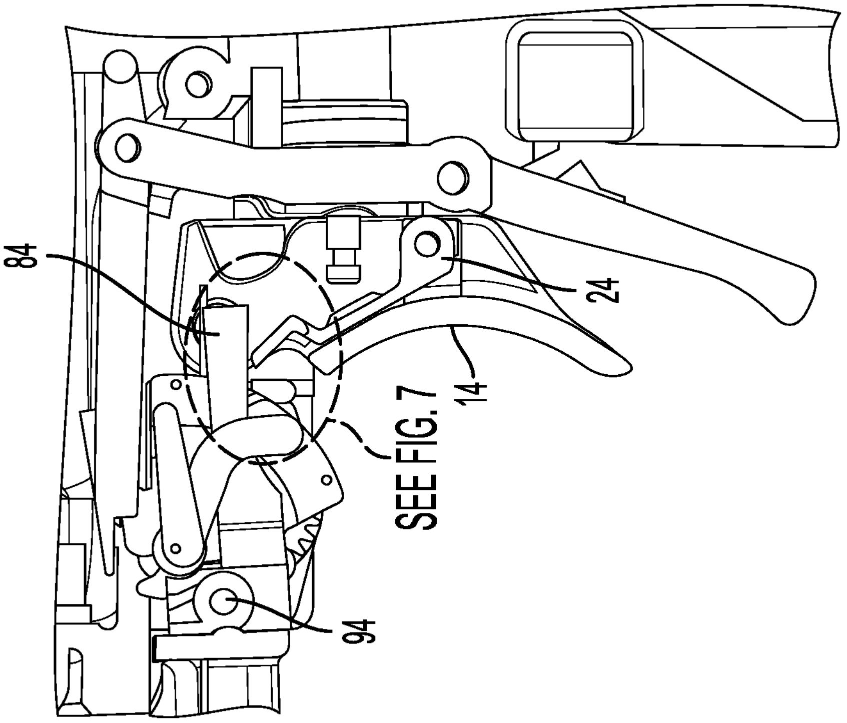
FIG. 12 is a side elevation view of various components of the fastener driving tool trigger assembly of FIG. 1, in sequential mode showing the contact trip in its bypass position with the trigger in its actuating position.

In the contact trip bypass position, if the contact trip 80 is first moved rearward by engagement with the workpiece before the principal trigger 14 is pulled, such as illustrated in FIG. 8, the rear arm 84 of the contact trip 80 is able to engage the actuator 24. Engagement of the rear arm 84 with the actuator 24 moves the actuator 24 from its home to its actuating position which, in combination with the principal trigger 14 being in its actuating position, causes the tool 10 to propel the driver along the driver axis 30 and drive a fastener into the workpiece. On the other hand, as shown in FIGS. 11 and 12, in the contact trip bypass position, if the principal trigger 14 is first moved into its actuating position before the contact trip 80 is moved rearward by engagement with the workpiece, the rotation of the principal trigger 14 operates to lower the top of the actuator 24 relative to the rear arm 84 of the contact trip 80 to a position where the contact trip 80 can pass over or above (bypass) the top of the actuator 24. Thus, the trigger assembly 12 can ensure that the tool will not actuate in the sequential mode of operation unless the contact trip 80 is depressed before the principal trigger 14 is moved into its actuating position, as shown in FIGS. 11 and 12.

FIG. 13 illustrates the contact trip 80 in bump mode. In bump mode, the rear arm 84 of the contact trip 80 is aligned with the front arm 82, for example parallel to the driver axis 30, as shown in FIG. 13. In this arrangement, the rear arm 84 is in a position to contact the actuator 24 so long as the drive gear 50 of the mechanical timer mechanism 46 has not timed-out.

Figure 14B:
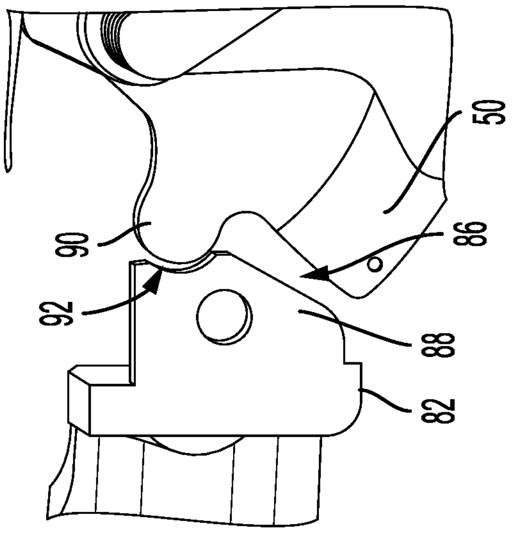
FIGS. 14A and 14B are side elevation views of various components of the fastener driving tool trigger assembly of FIG. 1 in their corresponding home and timed-out positions in bump mode.
Figure 14A:
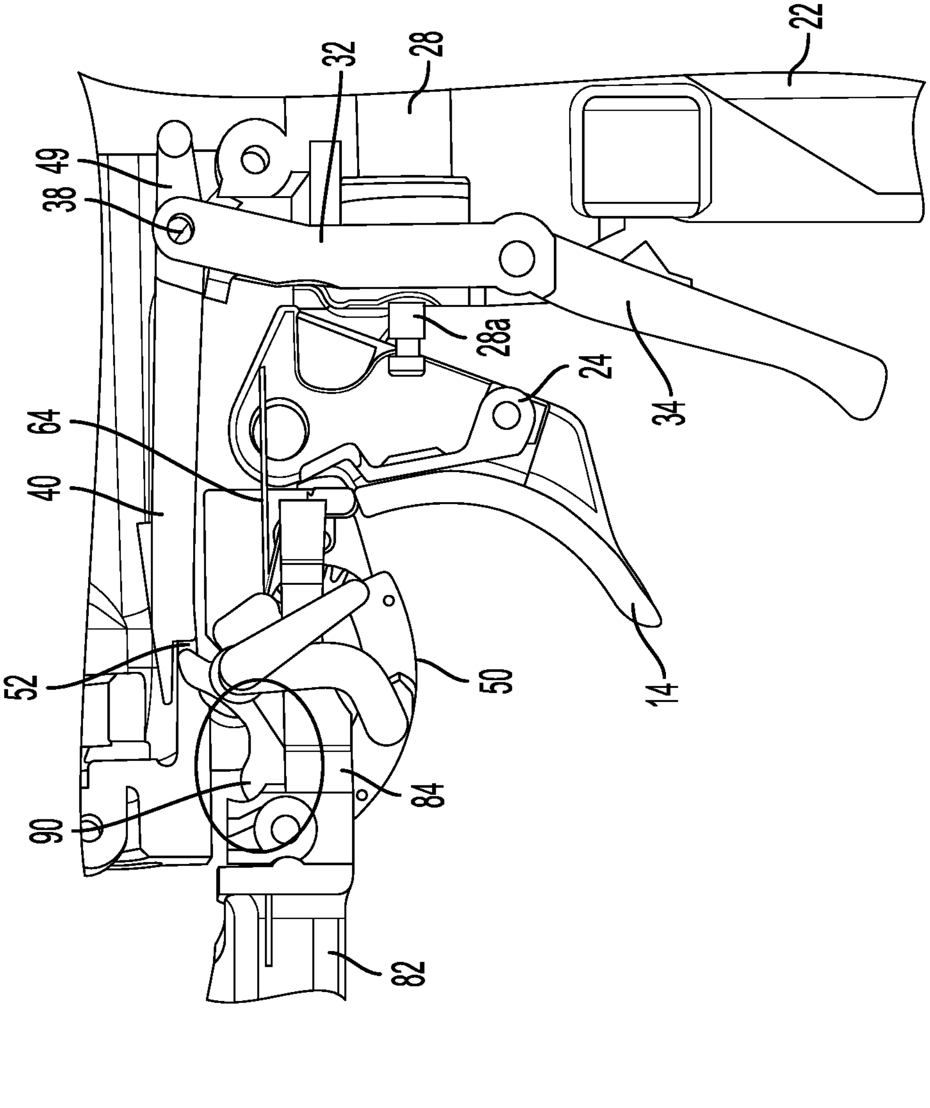

Operation of the fastener driving tool 12 in bump mode is described with particular reference to FIGS. 14A-17. FIG. 14A illustrates the drive gear 50 in an at-rest position. In bump mode, the drive gear 50 is moved from the at-rest or home position of FIG. 14A to a actuating position of FIG. 15 by the drive gear pushing member 40. The drive gear pushing member 40 is positioned to slidingly engage the spur portion 74 that projects outwardly on the drive gear 50. In an embodiment, the cutout or recess 52 on the drive gear pushing member 40 pushes and guides the drive gear 50 by contacting the spur portion 74. The overhang portion at the front end 48 of the drive gear pushing member 40 further guides the projections on the drive gear, when in contact. Engagement of the spur portion 74 by the cutout portion or recess 52 on the drive gear pushing member 40 also begins the rotation of the driven gear 58 with which the drive gear 50 is meshed.

Figure 15:
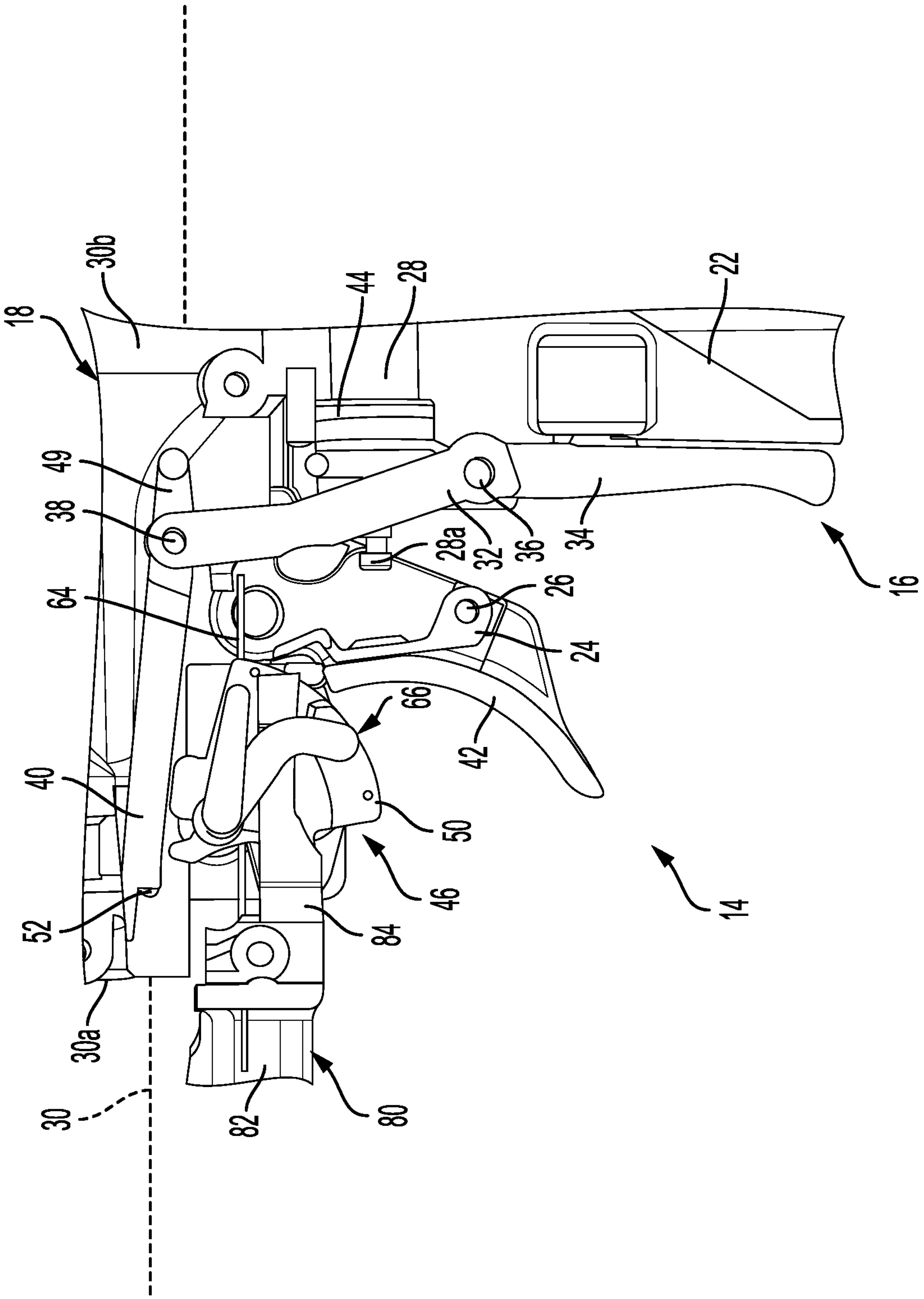
FIG. 15 is a side elevation view of various components of the fastener driving tool trigger assembly of FIG. 1 in their corresponding actuating and wind-up positions in bump mode.

To operate the tool in bump mode, the auxiliary trigger 16 can first be pulled toward the handle 22. Pushing the second handle 34 pivots the auxiliary trigger about the anchor 36. As seen in FIG. 15, the pivoting movement of the auxiliary trigger 16 moves the drive gear pushing member 40 toward the nose end 30*a* of the tool 10. The drive gear pushing member 40 recess 52 engages the spur portion 74 on the drive gear 50 to push and rotate the drive gear, for example counterclockwise, from its home or timed-out position as shown in FIG. 14A to the wind-up position as shown in FIG. 15. As the drive gear pushing member 40 continues to move toward the nose end 30*a* of the tool, the drive gear pushing member 40 is lifted away from the drive gear 50 along a predetermined path in the housing 18. In an embodiment, the predetermined path is non-parallel with the driver axis 30. For example, as shown in FIG. 15, the oblong lobe portion 78 of the drive gear 50 lifts the drive gear pushing member 40 away from drive gear. In this position, the recess 52 is forward of the drive gear 50. The drive gear pushing member has a planar surface adjacent to the oblong lobe portion 78 that allows the drive gear to rotate back to the timed-out or home position unobstructed. As shown in FIG. 14B, the timed-out or home position of the drive gear locks the contact trip 80. In particular, upon actuation of the auxiliary trigger 16 the drive gear 50 is released from the drive gear pushing member 40. The drive gear 50 then performs a clockwise return rotation, as shown by the arrow in FIG. 17, back to its timed-out or home position, as shown in FIG. 14B, under the influence of the timer spring 64 against the resistance of the rotary damper 54. If the principal trigger 14 is not actuated within a designated time, the drive gear 50 moves to the at timed-out or home position and locks the contact trip 80 again.

Figure 16:
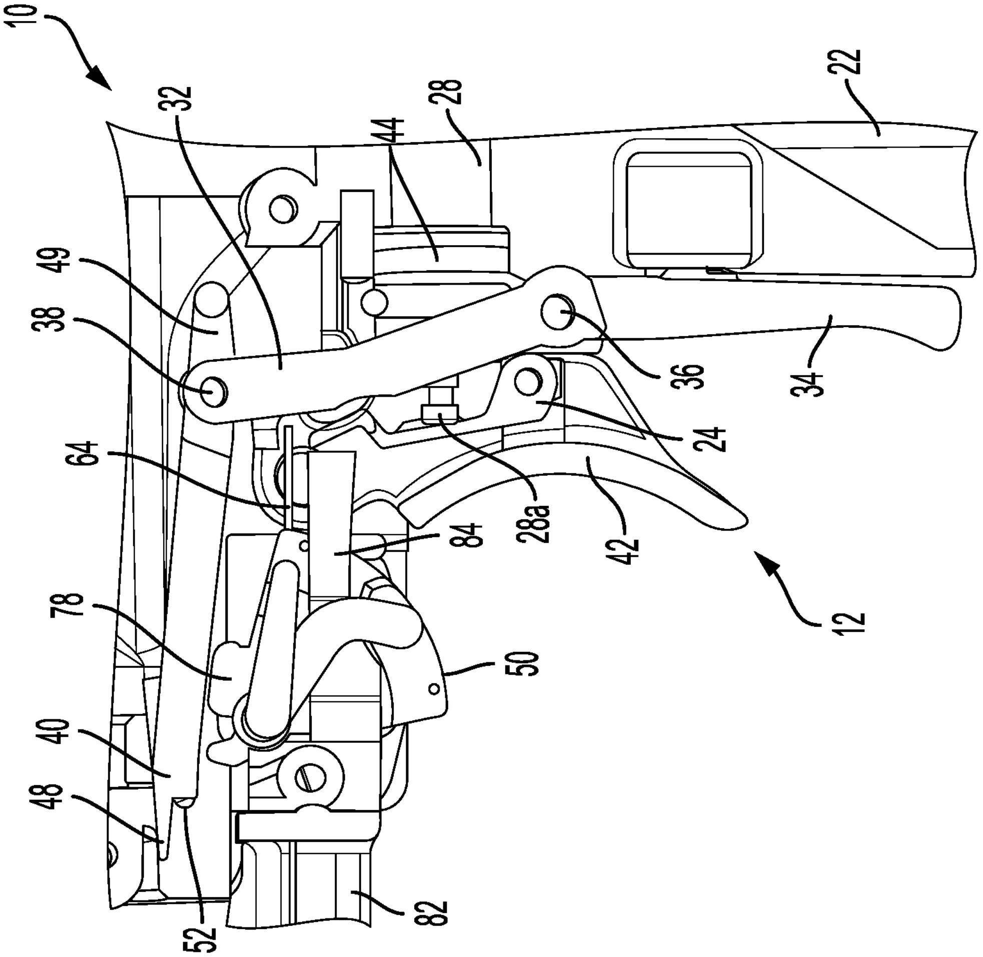
FIG. 16 is a side elevation view of various components of the fastener driving tool trigger assembly of FIG. 1 in their corresponding actuating and wind-up positions.

During this period, the actuator 24 is initially still in its home position relative to the principal trigger 14. As the contact trip 80 is pressed against a workpiece, the contact trip 80 moves away from the nose end 30*a* and toward a rear end 30*b* of the driver axis 30. During this rearward movement of the contact trip 80 from its home position into its actuating position, the rear arm 84 of the contact trip 80 engages the actuator 24, causing the actuator 24 to be rotated relative to the principal trigger 14. For example, the actuator 24 is rotated clockwise about pivot pin 26, from its home position, as shown in FIG. 14B to a actuating position in FIG. 16 in which the actuator 24 engages and actuates the trigger valve 28. As a result, the tool 10 is actuated to drive the driver and fastener along the driver axis 30. In other words, actuation of the tool 10 in bump mode, as shown in FIG. 16, requires rotation of the free end 34 of the auxiliary trigger 16, for example counterclockwise, from its home position toward the handle 22, rotation of the principal trigger 14, for example counterclockwise, from its home position toward the trigger valve 28 and rotation of the actuator 24, for example clockwise, relative to the principal trigger 14 from its home position toward the trigger valve 28. In summary, in bump mode, all of the principal trigger 14, auxiliary trigger 16 and the actuator 24 must be in their actuating positions before the trigger valve 28 is actuated.

Figure 17:
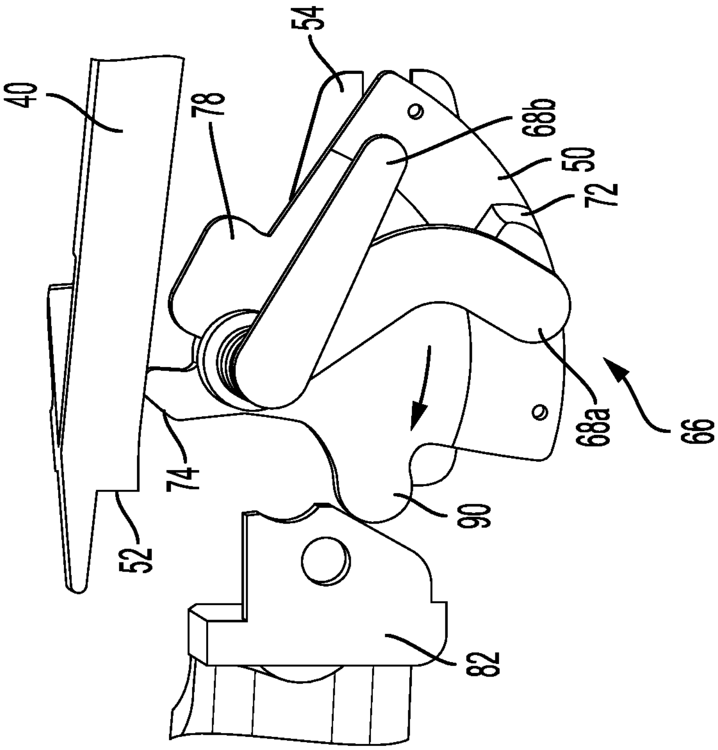
FIG. 17 is a side elevation view of the drive gear in the wind-up position.

During this rearward movement of the contact trip 80 from its home position into its actuating position, cooperating engagement surfaces 86 of the front arm 82 of the contact trip 80 and the drive gear 50 engage each other. As shown for example, in FIGS. 14B and 17, the protrusion 90 of the drive gear 50 engages a beveled edge portion 88 of the cooperating engagement surface 86 of the front arm 82. In an embodiment, the beveled edge portion 88 is a planar surface. As illustrated in FIG. 17, as long as the principal trigger 14 remains in its actuating position and the drive gear 50 has not timed-out by reaching its home position, each time the contact trip 80 is pressed against a workpiece, the beveled edge portion 88 of the front arm 82 of the contact trip 80 engages the protrusion 90 and rotates the drive gear 50 downward or away from the recess 92, the back into its wind-up position to re-start the mechanical timer mechanism 46.

Thus, the contact trip 80 can then be placed into repeated consecutive contact with the workpiece or "bumped" to both rotate the actuator 24 into its actuating position, and re-wind the drive gear 50 into is wind-up position to re-start the mechanical timer 46.

FIG. 14B illustrates that if a predetermined amount of time or too much time has passed since the prior "bump" actuation, the drive gear 50 rotated back into its timed-out position. In the timed-out position, the drive gear 50 is positioned so that the locking nose portion 90 engages the contact trip recess 92 in the front arm 82 of the contact trip 80 in. The contact trip recess 92 although illustrated as a concave surface, can have any shape that can retain the locking nose portion 90 of the drive gear. In this position, the beveled edge portion 88 is unable to re-wind the drive gear 50, and rearward movement of the rear arm 84 of the contact trip 80 toward the actuator 24 to initiate its actuating position is halted. In an embodiment, the cooperating engagement surfaces 86 of the contact trip 80 and drive gear 50 in its timed-out position can be positioned perpendicular or non-parallel to the axial direction of movement of the contact trip 80. As a result, the tool 10 will not actuate again until the principal trigger 14 and auxiliary trigger 16 are allowed to return to their home positions and are then re-rotated into their actuating positions, resulting in the drive gear 50 again being rotated by the drive gear pushing member 40 from its home or timed-out position as shown in, for example, FIGS. 14A and 14B, to its wind-up position as shown in, for example, FIGS. 15-17 to initiate another "bump" fastener driving cycle.

The cooperating engagement surfaces 86 of the contact trip 80 and drive gear 50 can also be shaped to prevent the tool 10 from actuating while the tool is in bump mode if the contact trip 80 is engaged against the workpiece before pulling the auxiliary trigger 16 and the principal trigger 14. For example, the locking nose portion 90 on the drive gear 50 slidingly engages the recess 92 on the contact trip front arm 82 to form a lockout engagement when the rear arm 84 of the contact trip 80 is pressed against the drive gear 50 in its timed-out position. This engagement prevents rotation of the drive gear 50, which in turn prevents actuation of the principal trigger 14. In an embodiment, the locking nose portion 90 is shown as being on the drive gear 50 and the recess 92 is shown as being on the front arm 82 of the contact trip 80. In an alternative embodiment, the locking nose portion can be on the front arm of the contact trip and the recess can be on the drive gear.

As the front arm 82 of the contact trip 80 engages the workpiece and begins moving rearward along the driver axis 30, the movement of the front arm 82 can be transmitted to corresponding movement of the rear arm 84 via a contact trip pivot pin 94. The rear arm 84 is spring-loaded and pivots on the front arm 82 through the contact trip pivot pin 94. In an embodiment, the rear arm 84 is spring loaded in a clockwise direction as viewed in FIGS. 7 and 13. Cooperating engagement surfaces 96 between the contact trip front arm 82 and contact trip rear arm 84 are arranged to limit the rotational angle of the rear arm 84 with respect to the front arm 82. In an embodiment illustrated in FIGS. 7 and 13, the engagement surface 96 on the front arm 82 can have a protrusion 98 that mates with a recess 100 on the corresponding engagement surface 96 of the rear arm 84 to limit the rotation of the rear arm 84 with respect to the front arm 82.

Additionally, as shown in FIG. 13, the contact trip pivot pin 94 can include a spring (not shown) such as, for example, a torsion spring mounted thereon between the front arm 82 and rear arm 84 of the contact trip 80. If the biasing force of the spring is overcome, however, the front arm 82 can continue to move rearwardly while the rear arm 84 is stopped. For example, when the rear arm 84 is prevented from moving rearward due to the drive gear 50 being in its home or timed-out position, the contact trip pivot pin 94 limits the force transmitted to the drive gear 50, which can protect the drive gear 50 and other components from the tool 10 being bumped or otherwise engaged with significant force against the workpiece.

While aspects of the present invention are described herein and illustrated in the accompanying drawings in the context of a pneumatic fastener driving tool, those of ordinary skill in the art will appreciate that the invention, in its broadest aspects, has further applicability. As but one example, the driven gear 58, the drive gear 50, or both, can take the form of linearly arranged teeth, instead of the radially arranged teeth illustrated in the drawing figures.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein, even if not specifically shown or described, so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A fastener driving tool trigger assembly comprising:

a rotary damper coupled to a tool housing, the rotary damper having a damper shaft;

a driven gear coupled to the damper shaft to transfer rotation of the driven gear to the damper shaft in a first direction;

a drive gear coupled to the tool housing and being movable between a timed-out position and a wind-up position and biased toward the timed-out position; the drive gear being operably coupled to the driven gear to rotate the driven gear in the first direction as the drive gear moves away from the wind-up position toward the timed-out position and to rotate the driven gear in a second direction opposite the first direction as the drive gear moves away from the timed-out position toward the wind-up position;

a principal trigger pivotably coupled to the tool housing and movable between a principal trigger home position and a principal trigger actuating position;

an auxiliary trigger pivotably coupled to the tool housing and movable between an auxiliary trigger home position and an auxiliary trigger actuating position;

an actuator pivotably coupled to the principal trigger and movable between an actuator home position and an actuator actuating position;

a drive gear pushing member coupled to the auxiliary trigger and engageable with the drive gear to move the drive gear from the timed-out position to the wind-up position in response to the auxiliary trigger moving from the auxiliary trigger home position to the auxiliary trigger actuating position;

a contact trip coupled to the housing and movable between a contact trip home position and a contact trip actuating position and, with the drive gear positioned between the timed-out and wind-up positions, the contact trip being engageable with the drive gear to move the drive gear into the wind-up position as the contact trip moves from the contact trip home position to the contact trip actuating position and, with the principal trigger positioned in the principal trigger actuating position, the contact trip being engageable with the actuator to move the actuator into the actuator actuating position as the contact trip moves from the contact trip home position to the contact trip actuating position and, with the drive gear positioned in the timed-out position, the contact trip being engageable with the drive gear, with the driving gear in an orientation which prevents the contact trip from rotating the drive gear into the wind-up position and prevents the contact trip from moving into the contact trip actuating position.

2. The fastener driving tool trigger assembly of claim 1, further comprising a one-way clutch coupled to the damper shaft between the damper shaft and the driven gear to transfer rotation of the driven gear to the damper shaft in the first direction, but not in the second direction.

3. The fastener driving tool trigger assembly of claim 2, wherein the driven gear is mounted on the damper shaft with the one-way clutch mounted on the damper shaft between the driven gear and the damper shaft.

4. The fastener driving tool trigger assembly of claim 1, wherein the contact trip has a front arm and a rear arm moveably coupled together at a coupling including a biasing member, the front arm of the contact trip being selectively engageable with a workpiece, and the rear arm of the contact trip being selectively engageable with the drive gear, and wherein the biasing member allowing the front arm to continue moving away from the principal trigger home position while movement of the rear arm away from the principal trigger home position is arrested by engagement of the drive gear with the drive gear positioned in the timed-out position in an orientation which prevents the rear arm from rotating the drive gear into the wind-up position and prevents the rear arm from moving into the contact trip actuating position.

5. The fastener driving tool trigger assembly of claim 1, wherein the drive gear pushing member includes a recess that engages a wind-up protrusion of the drive gear to move the drive gear from the timed-out position to the wind-up position in response to the auxiliary trigger moving from the auxiliary trigger home position to the trigger actuating position.

6. The fastener driving tool trigger assembly of claim 1, wherein, with the drive gear positioned in the timed-out position, cooperating engagement surfaces of the drive gear and the contact trip are positioned normal to a direction of movement of the contact trip between the contact trip home position and the contact trip actuating position.

7. The fastener driving tool trigger assembly of claim 1, wherein cooperating engagement surfaces of the drive gear and contact trip include a protrusion and a recess, respectively, and with the drive gear positioned in the timed-out position and the contact trip engaged against cooperating engagement surfaces of the drive gear, the protrusion being received in the recess to limit movement of the principal trigger from the principal trigger home position to the principal trigger actuating position.

* * * * *